United States Patent
Toda et al.

(10) Patent No.: US 9,896,124 B2
(45) Date of Patent: Feb. 20, 2018

(54) STEERING CONTROL APPARATUS

(71) Applicant: Mitsubishi Electric Corporation, Tokyo (JP)

(72) Inventors: Taizo Toda, Tokyo (JP); Masaya Endo, Tokyo (JP); Yoshihiko Kimpara, Tokyo (JP); Kenji Ogawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/122,712

(22) PCT Filed: May 30, 2014

(86) PCT No.: PCT/JP2014/064409
§ 371 (c)(1),
(2) Date: Aug. 31, 2016

(87) PCT Pub. No.: WO2015/181948
PCT Pub. Date: Dec. 3, 2015

(65) Prior Publication Data
US 2017/0066474 A1 Mar. 9, 2017

(51) Int. Cl.
*A01B 69/00* (2006.01)
*B62D 6/00* (2006.01)
(Continued)

(52) U.S. Cl.
CPC ............. *B62D 6/00* (2013.01); *B62D 5/0463* (2013.01)

(58) Field of Classification Search
CPC .................................................... B62D 5/046
See application file for complete search history.

(56) References Cited

U.S. PATENT DOCUMENTS

| | | | | |
|---|---|---|---|---|
| 2012/0232759 A1* | 9/2012 | Oniwa | .............. | B62D 5/0463 701/41 |
| 2015/0112551 A1* | 4/2015 | MacLaughlin | ...... | B62D 5/0463 701/41 |

FOREIGN PATENT DOCUMENTS

| | | |
|---|---|---|
| JP | 2003-19974 A | 1/2003 |
| JP | 2009-227125 A | 10/2009 |

(Continued)

OTHER PUBLICATIONS

International Search Report for PCT/JP2014/064409 dated Aug. 26, 2014.

*Primary Examiner* — Imran Mustafa
(74) *Attorney, Agent, or Firm* — Sughrue Mion, PLLC; Richard C. Turner

(57) ABSTRACT

A steering control apparatus is obtained which includes an assist instruction-value correction device for calculating, based on a result of a friction transition-state determination device, an assist correction value in order to obtain an assist instruction-value after its correction being made by correcting a basic assist instruction-value so that a hysteresis width of steering torque increases at the time of turn-back steering, and an electric current driving device for driving a motor so that an electric current of the motor is coincident with an electric current instruction-value therefor after its correction being made on the basis of the assist instruction-value after its correction being made; and the friction transition-state determination device determines the friction transition-state by integrating a differential value of steering-shaft reaction torque using an integrator having a limiting function to an upper or lower limit value defined in advance.

8 Claims, 11 Drawing Sheets

(51) Int. Cl.
  *B62D 11/00* (2006.01)
  *B62D 12/00* (2006.01)
  *B63G 8/20* (2006.01)
  *B63H 25/04* (2006.01)
  *G05D 1/00* (2006.01)
  *G06F 7/00* (2006.01)
  *G06F 17/00* (2006.01)
  *G06F 19/00* (2011.01)
  *B62D 5/04* (2006.01)

(56) References Cited

FOREIGN PATENT DOCUMENTS

JP  2010-274822 A  12/2010
JP  2013-56632 A  3/2013
JP  2013-249043 A  12/2013

\* cited by examiner

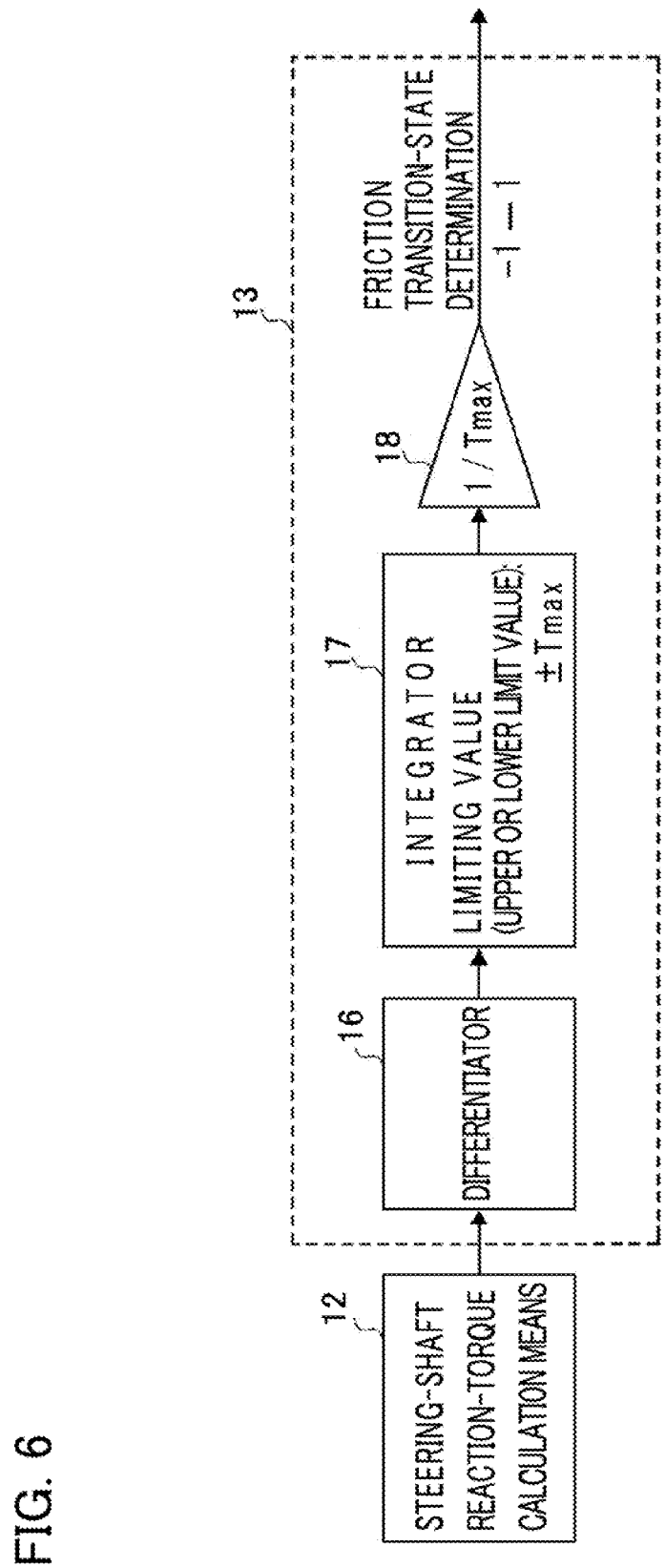

STEERING CONTROL APPARATUS

CROSS REFERENCE TO RELATED APPLICATIONS

This application is a National Stage of International Application No. PCT/JP2014/064409 filed May 30, 2014, the contents of which are incorporated herein by reference in its entirety.

TECHNICAL FIELD

The present invention relates to a steering control apparatus which assists steering of a driver.

BACKGROUND ART

In a conventional steering control apparatus, a proposal is made in which, in order to curb change in hysteresis widths while the on-center steering feel of steering torque is maintained and to obtain good steering feelings, an assist instruction means is included to correct, using steering-shaft reaction torque and road-surface reaction torque, a basic assist instruction-value toward its increase on the basis of the steering-shaft reaction torque, when determination is performed on at least a return steering state, and then a return steering state is determined. (For example, refer to Patent Document 1.)

Also as a conventional technology, a technique is also proposed in which an assist correction value is calculated based on a steering-wheel's rotational direction (steering velocity). (For example, refer to Patent Document 2.)

RELATED ART DOCUMENTS

Patent Documents

[Patent Document 1] Japanese Laid-Open Patent Publication No. 2009-227125 (Page 8, FIG. 2)
[Patent Document 2] Japanese Laid-Open Patent Publication No. 2003-19974

SUMMARY OF THE INVENTION

Problems to be Solved by the Invention

In such a conventional steering control apparatus, because steering-shaft reaction torque and road-surface reaction torque are used in order to determine a steering state, it has been necessary to include both of a steering-shaft reaction-torque detection means and a road-surface reaction-torque detection means. Because the road-surface reaction-torque detection means is constituted of a detection means such as a load cell (s) or the like provided on a tire (s), there arise problems in securing a mounting space, and an increase in the number of mounting man-hours. In addition, there also exist a technique for estimating road-surface reaction torque without including a detection device (for example, Japanese Laid-Open Patent Publication No. 2003-312521); however, there arise problems in that the number of man-hours for designing parameters used by an estimator increases, and a calculation load of the estimator increases. Moreover, a configuration is taken to determine a steering state by comparing steering-shaft reaction torque with road-surface reaction torque, so that there arises a problem in that a highly accurate detection value or a highly accurate estimation value is required for the road-surface reaction torque to be used.

The present invention has been directed at solving these problems described above, and an object of the invention is to obtain a steering control apparatus in which, without using road-surface reaction torque, a friction transition-state is determined by only using steering-shaft reaction torque, and hysteresis widths of steering torque can be adjusted.

Means for Solving the Problems

A steering control apparatus according to the present invention comprises: a steering torque detection means for detecting steering torque of a steering mechanism steered by a driver of a wheeled vehicle; a vehicle speed detection means for detecting a vehicle speed of the wheeled vehicle; a motor for giving steering assist force thereby to the steering mechanism; asteering-shaft reaction-torque calculation means for detecting or calculating steering-shaft reaction torque acting on a steering shaft of the steering mechanism; a basic assist instruction-value calculation means for calculating a basic assist instruction-value being an electric current instruction-value to cause a current flow in the motor, based on steering torque detected by the steering torque detection means, and a vehicle speed detected by the vehicle speed detection means; a friction transition-state determination means for determining a friction transition-state, based on the steering-shaft reaction torque; an assist instruction-value correction means for calculating, based on a result of the friction transition-state determination means, an assist correction value in order to obtain an assist instruction-value after its correction being made by correcting the basic assist instruction-value so that a hysteresis width of steering torque increases at the time of turn-back steering; and an electric current driving means for driving the motor so that an electric current of the motor is coincident with an electric current instruction-value therefor after its correction being made on the basis of the assist instruction-value after its correction being made, wherein the friction transition-state determination means determines a friction transition-state by integrating a differential value of the steering-shaft reaction torque using an integrator having a limiting function to an upper or lower limit value defined in advance.

Effects of the Invention

According to the present invention, it is not required to use road-surface reaction torque, and a friction transition-state can be determined in good accuracy. As a result, it is not required to include a road-surface reaction-torque detection device, so that the installation-space reduction and reductions in the number of mounting man-hours can be achieved. Moreover, it is not also required to include a road-surface reaction-torque estimator, so that significant effects can be achieved such as reductions in the number of designing man-hours, and mitigation of a calculation load which are not conventionally found. Furthermore, because the friction transition-state can be accurately determined, it becomes possible to freely adjust hysteresis widths of steering torque with stability.

BRIEF DESCRIPTION OF DRAWINGS

FIG. 6 is a block diagram illustrating a configuration of a friction transition-state determination means in the steering control apparatus according to Embodiment 1 of the present invention;

EMBODIMENTS FOR CARRYING OUT THE INVENTION

Figure 1:
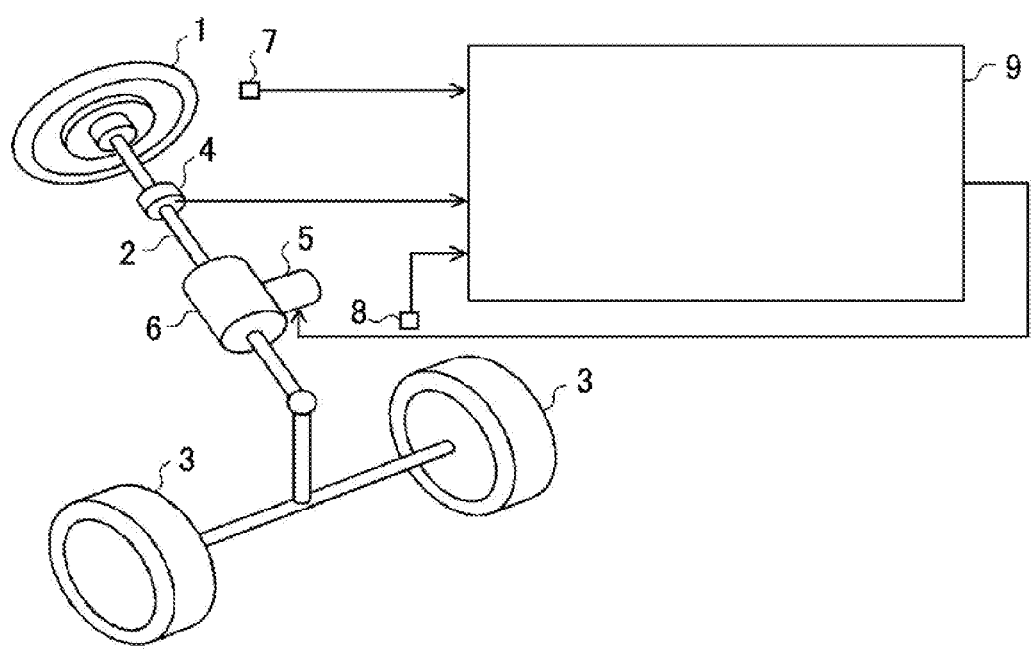
FIG. 1 is a diagram illustrating a configuration of a steering control apparatus according to Embodiment 1 of the present invention.

Hereinafter, the embodiments of the present invent ion will be described in detail referring to the drawings. It should be noted that the same reference numerals and symbols designate the same items as, or the items corresponding to, those shown in each of the figures.

Embodiment 1

FIG. 1 is a diagram illustrating a configuration of a steering control apparatus according to Embodiment 1 of the present invention. Left and right wheels 3 undergo their turn directions in accordance with the rotation of a steering shaft 2 interconnected to a steering wheel 1 constituting a steering mechanism. On the steering shaft 2, a torque sensor 4 being a steering torque detection means is mounted, so that steering torque acting on the steering shaft 2 is detected. A motor 5 is interconnected to the steering shaft 2 by way of a reduction mechanism 6, so that steering assist torque produced by the motor 5 can be given to the steering shaft 2. A vehicle speed of a wheeled vehicle is detected by a vehicle speed sensor 7 which is a speed detection means. In addition, an electric current flowing in the motor 5 is detected by an electric current sensor 8.

A control unit 9 is a device for calculating steering assist torque produced by the motor 5, and for controlling an electric current of the motor 5 required for producing the steering assist torque; the control unit comprises a microprocessor provided with a memory including a ROM and a RAM, and an electric current driving means 10 (refer to FIG. 2) for driving a motor current so that the motor current is coincident with an electric current instruction-value corresponding to the steering assist torque, as will be described later.

Figure 2:
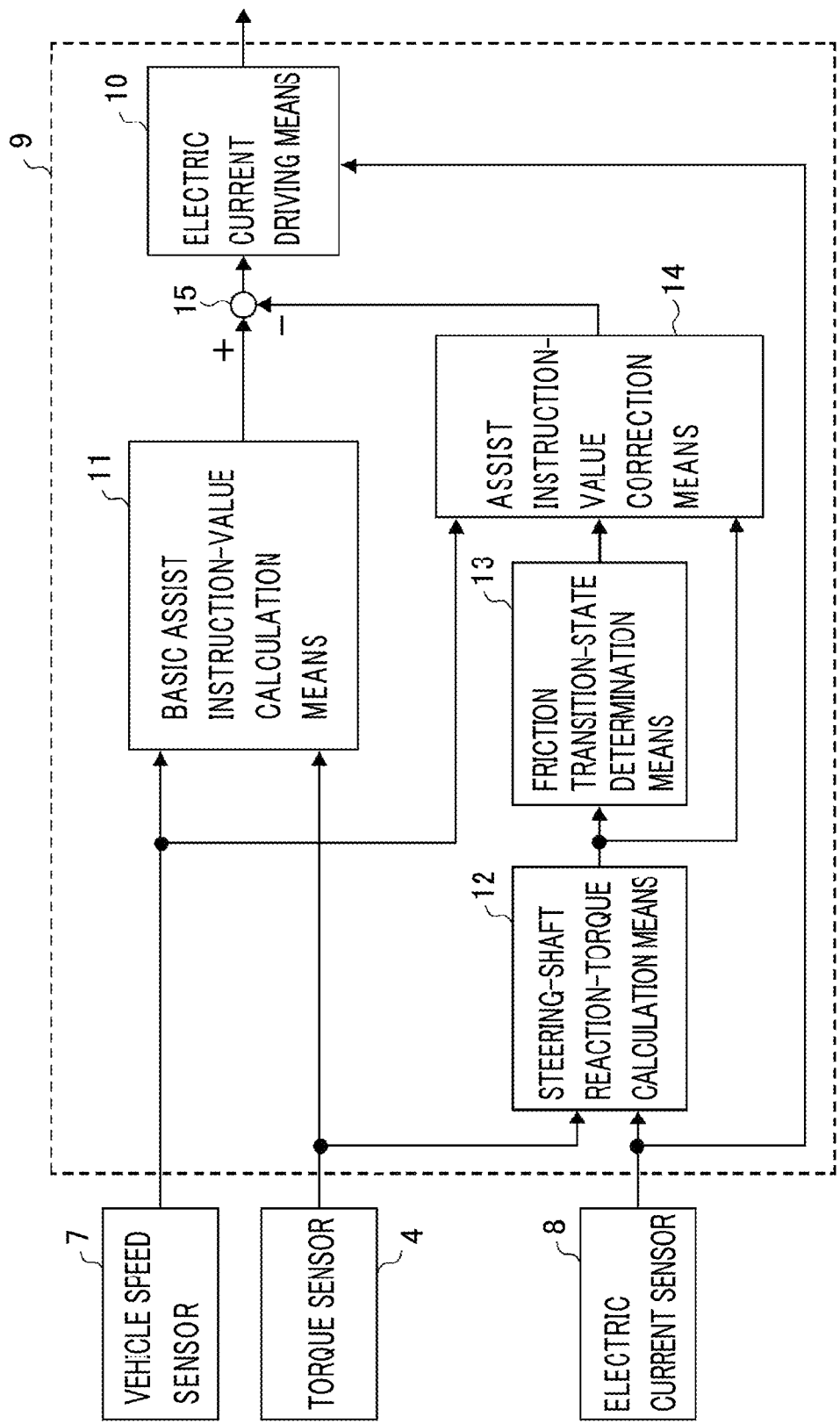
FIG. 2 is a block diagram illustrating the principal part of the steering control apparatus according to Embodiment 1 of the present invention.
Figure 3:
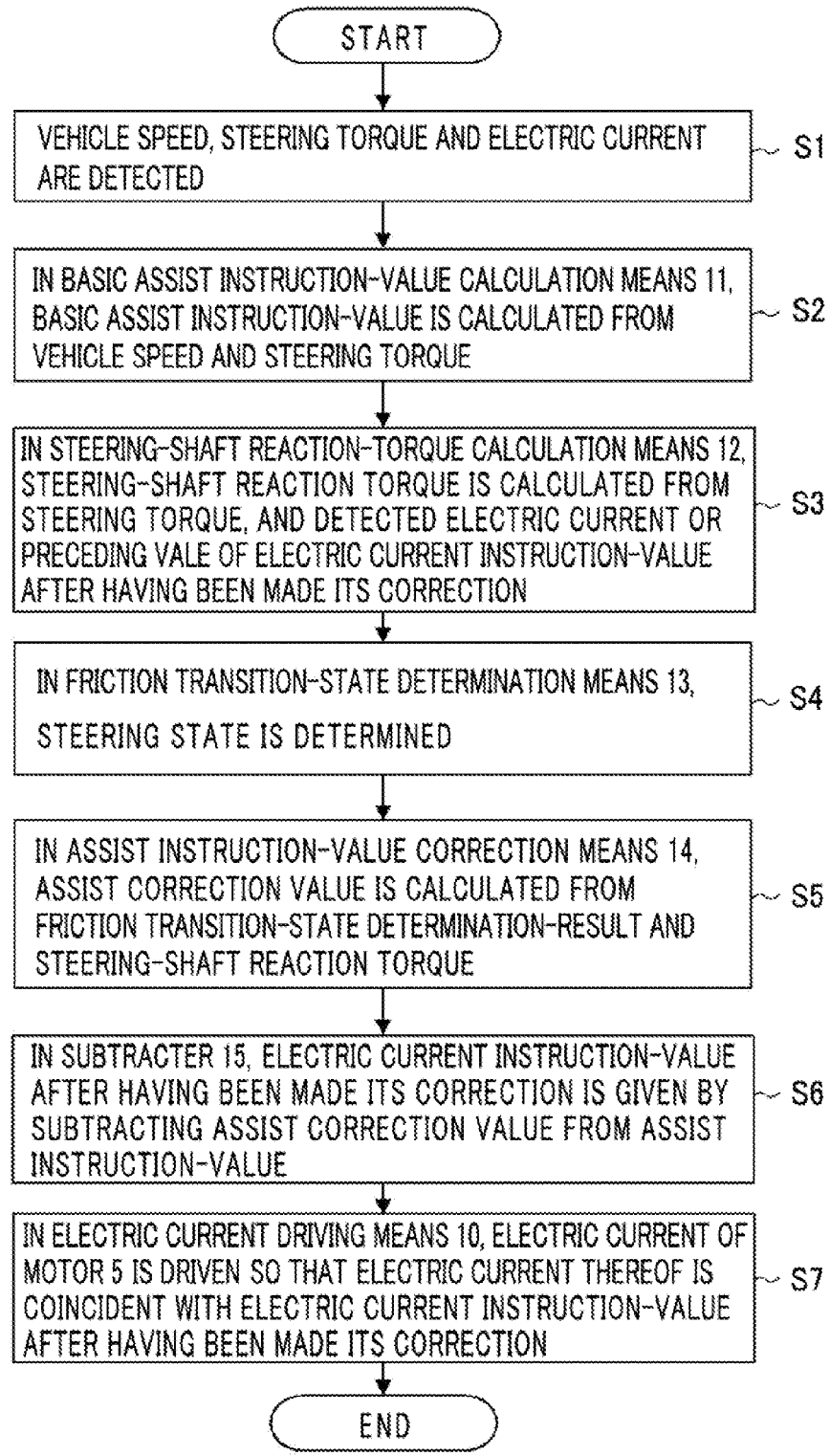
FIG. 3 is a flowchart for explaining operations of the steering control apparatus according to Embodiment 1 of the present invention.

Next, the explanation will be made, referring to a block diagram illustrated in FIG. 2 and a flowchart shown in FIG. 3, for a configuration and operations of the control unit 9 which is the principal part in the present invention. Note that, the operations shown in the flowchart are repeatedly executed in a control period of predetermined time.

The control unit 9 has the electric current driving means 10 for driving a motor current, a basic assist instruction-value calculation means 11, a steering-shaft reaction-torque calculation means 12, a friction transition-state determination means 13, an assist instruction-value correction means 14, and a subtracter 15.

At Step S1, a vehicle speed V is detected by the vehicle speed sensor 7. Steering torque Thdl is detected by the torque sensor 4. An electric current Im flowing in the motor 5 is detected by the electric current sensor 8.

Figure 4:
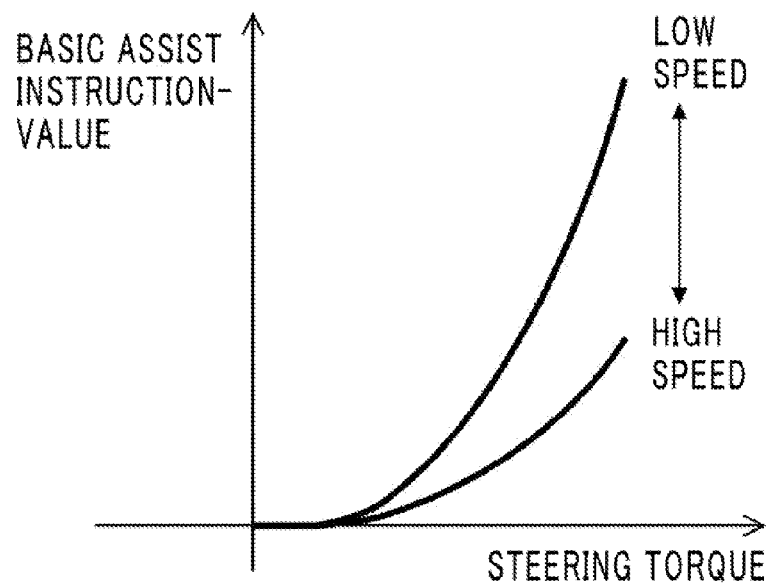
FIG. 4 is a diagram showing an assist map of the steering control apparatus according to Embodiment 1 of the present invention.

At Step S2, in the basic assist instruction-value calculation means 11, a basic assist instruction-value is calculated at least from a vehicle speed and steering torque. This basic assist instruction-value is a motor's electric current instruction-value for producing motor torque which assists driver's steering. The basic assist instruction-value is calculated by publicly known technologies of the steering control apparatus. For example, as shown in FIG. 4, an assist map defining the relationship among steering torque Thdl, a vehicle speed V and a basic assist instruction-value corresponding to an electric current instruction-value to the motor is formed in advance, and, from the assist map, a basic assist instruction-value corresponding to an electric current instruction-value is read out in accordance with the steering torque Thdl and the vehicle speed V as to be obtained. This assist map is defined in general so that the higher steering torque Thdl is, the larger a basic assist instruction-value (electric current instruction-value) becomes, and also the larger its gradient does, as shown in FIG. 4. In addition, it is so defined that the higher the vehicle speed V is, the smaller the basic assist instruction-value (electric current instruction-value) becomes. Note that, it may be adopted that the basic assist instruction-value is defined by further adding thereto damping torque using a motor's rotational angular velocity, or the like.

At Step S3, calculated by the steering-shaft reaction-torque calculation means 12 is steering-shaft reaction torque which denotes the torque acting on a steering-wheel turn tire-wheel's side portion (hereinafter referred to as a "pinion shaft") farther from the reduction mechanism 6 of the steering shaft 2. An equation of motion of the steering mechanism is expressed by next Equation (1).

[Equation 1]

$$Jp\ddot{\theta}p = Thdl + Ggear\, Kt\, Im - Ttran, \quad \text{Equation (1)}$$

where $\dot{\theta}p$ designates a rotational angular velocity of a pinion shaft.

Here, Jp designates inertia moment of the pinion shaft; θp, a rotation angle of the pinion shaft; Ggear, a reduction ratio of the reduction mechanism 6; Kt, a torque constant of the motor; and Ttran, steering-shaft reaction torque. Term "Ggear Kt Im" denotes motor torque acting on the pinion shaft. Presuming that the inertia moment of the pinion shaft and the rotational angular velocity of the pinion shaft are small, and then by ignoring coasting torque on the left-hand side, the steering-shaft reaction torque can be calculated by next Equation (2).

$$Ttran = Thdl + Ggear\, Kt\, Im \qquad \text{Equation (2)}$$

Namely, at Step S3, steering-shaft reaction torque is calculated, using Equation (2), from the steering torque Thdl detected by the torque sensor 4, and an electric current Im detected by the electric current sensor 8, so that the steering-shaft reaction torque is detected through the calculation.

Note that, as for the calculation of the steering-shaft reaction torque, the term of inertia torque may be taken into consideration using a motor's rotation angle and/or a steering-wheel angle. In addition, instead of a detection current Im detected by the electric current sensor 8, an electric current instruction-value may be used. Because the electric current driving means 10 drives a motor current so that the motor current is coincident with an electric current instruction-value, the steering-shaft reaction torque can be accurately calculated even when an electric current instruction-value is used. Note that, when the electric current instruction-value is used, the immediately preceding vale of an electric current instruction-value after having been made its correction is used in order to avoid an algebraic loop operation, as will be described later.

At Step S4, a friction transition-state is determined in the friction transition-state determination means 13. In the present invention, a friction transition-state is defined as a changing state of friction acting on the steering shaft 2 when a driver is steering.

Figure 5A:
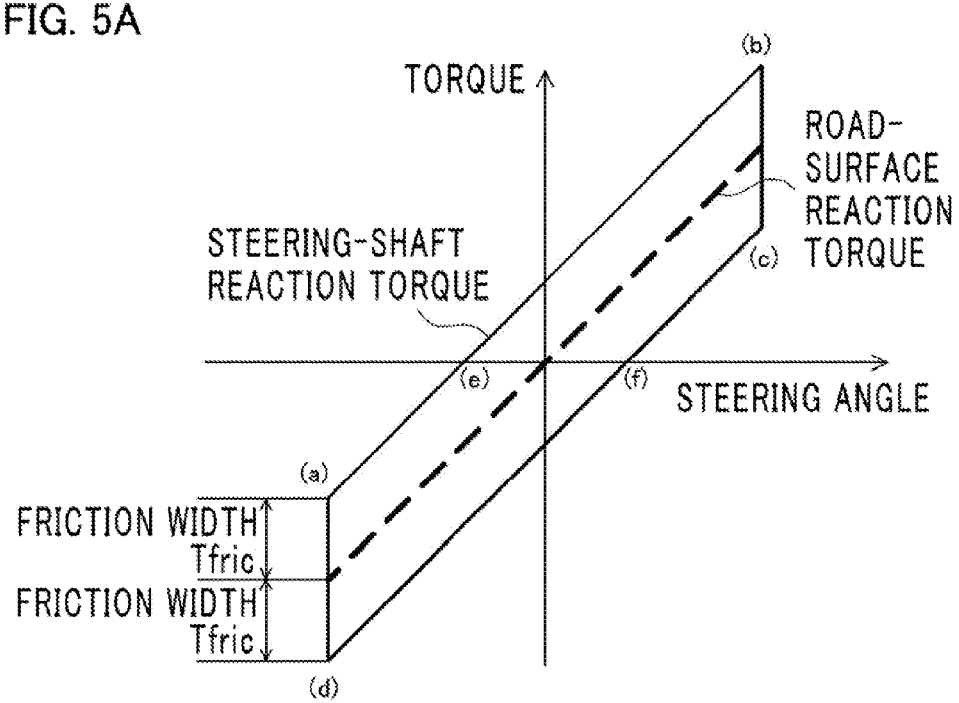
FIG. 5A is a diagram illustrating change in hysteresis widths of steering-shaft reaction torque in the steering control apparatus according to Embodiment 1 of the present invention.
Figure 5B:
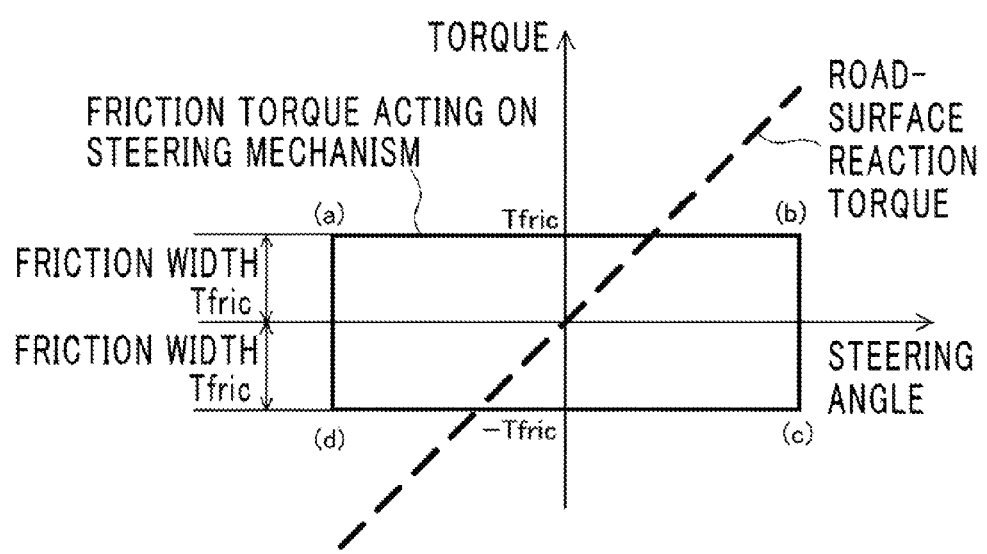
FIG. 5B is a diagram illustrating change in hysteresis widths of friction torque which acts on a steering mechanism in the steering control apparatus according to Embodiment 1 of the present invention.

FIG. 5A and FIG. 5B are diagrams for explaining changes in steering-shaft reaction torque and friction. FIG. 5A is a diagram depicting change in hysteresis widths of the steering-shaft reaction torque. FIG. 5B is a diagram depicting changes in the steering-shaft reaction torque by separating it into changes in road-surface reaction torque and those in friction torque which acts on the steering mechanism.

The road-surface reaction torque is reactive force produced between the wheels 3 and a road surface when the steering-wheel turn tire-wheels undergo their turn directions. Because the steering-shaft reaction torque being reactive torque acting on the steering shaft 2 becomes the torque, in addition to this road-surface reaction torque, combined with friction torque acting on the steering mechanism, the steering-shaft reaction torque changes by exhibiting hysteresis with the width of friction torque, in comparison with the road-surface reaction torque.

In FIG. 5A and FIG. 5B, in order to explain changes in hysteresis widths of the steering-shaft reaction torque, and hysteresis widths of friction torque which acts on the steering mechanism, respectively, symbols (a) to (f) designate the positions in specific places of the loops exhibiting the hystereses. Hereinafter, the position (a), the position (b), etc. are for example referred to.

When a steering angle is altered by steering from the position (a) to the position (b), friction torque acts on as dynamical friction torque Tfric. Meanwhile, when the steering is halted at the position (b), the friction torque is Tfric, but the torque transits to a static friction state. Next, when the steering is intended from the position (b) toward the neutral point, the static friction torque is reduced in accordance with the steering torque supporting the steering wheel which gets smaller, because the steering shaft 2 is in a static friction state; and, after the friction torque becomes zero, an acting direction of the friction is reversed. That is to say, the friction torque acts as resistance with respect to the intension to steer toward the neutral point. Moreover, with respect to the sum of the steering torque supporting the steering wheel, motor's steering assist torque and the static friction torque, the friction torque changes from static friction (−Tfric) to dynamical friction (−Tfric) in a state at the position (c) where the magnitude of road-surface reaction torque is superior to that of the steering wheel acting to return it to the neutral point, so that the steering shaft 2 starts rotationally moving toward the neutral point. That is to say, the static friction torque as the friction torque is predominant from the position (b) to the position (c), so that the magnitude of the friction torque gets evenly proportional to that of the external force acting on the steering shaft 2; for this reason, the steering shaft 2 becomes approximately in a standstill state. Namely, when the steering is held in a process of turn-back steering, the friction torque becomes static friction, so that its magnitude results in taking on a value between Tfric and −Tfric. Furthermore, when steering-angle increase is performed for a second time in the process of turn-back steering, the friction torque increases at a value between Tfric and −Tfric, and afterward takes a value of Tfric, so that the steering shaft 2 starts rotationally moving. When the steering is performed from the position (c) to the position (d), the hysteresis width takes −Tfric. In regard to turn-back steering from the position (d) to the position (a), the steering shaft 2 halts similarly to the changes from the position (b) to the position (c), and the friction torque becomes static friction, whose magnitude changes from −Tfric to Tfric, and then gets to come dynamical friction, so that the steering shaft 2 starts rotationally moving toward the neutral point.

FIG. 6 is a block diagram illustrating a configuration of the friction transition-state determination means 13. By a differentiator 16, steering-shaft reaction torque is differentiated so that the amount of change of the steering-shaft reaction torque is calculated. By an integrator 17 with a limiting function, the amount of change of the steering-shaft reaction torque is integrated. However, the integrator 17 includes a function for limiting its integration, at the time of integration, to an upper or lower limit value ±Tmax defined in advance, so that an integrated value is limited to the ±Tmax. By setting this limiting value Tmax to a friction width Tfric, an output result of the integrator 17 gives a result in which friction torque is extracted from the steering-shaft reaction torque. For example, when steering-angle increase is performed from the neutral point, a steering velocity is zero at the steering start, and static friction increases in a friction state to reach Tfric. At this time, change of friction torque is predominant in the change of the steering-shaft reaction torque, and an output of the integrator 17 becomes the same as change of friction torque, so that the output increases up to Tfric. From that time onward, the steering shaft 2 starts rotationally moving, so that friction torque transits to dynamical friction; change in road-surface reaction torque becomes predominant in the steering-shaft reaction torque, which increases in accordance with the increase in the road-surface reaction torque. At this time, the integrator 17 limits, according to its limiting function, its output to Tfric.

Next, when steering-wheel operations are halted as shown at the position (b), the friction transits to a static friction region, and the friction torque remains at Tfric as it is. At this time, the output of the integrator 17 is also held at Tfric as it is, because the steering-shaft reaction torque does not change. Subsequently, when the driver performs return steering, static friction changes from Tfric to zero, and from zero to −Tfric according to the decrease of steering torque. According to this, the steering-shaft reaction torque changes from the position (b) to the position (c). Because the change is extracted by the differentiator 16, and the integrator 17 performs the integration, so that an output of the integrator 17 changes from Tfric to zero, and from zero to −Tfric corresponding to the change of static friction torque. From the position (c) to the position (d), the friction torque takes a region of dynamical friction. Here, the steering-shaft reaction torque changes in accordance with a change of road-surface friction torque; however, the output of the integrator 17 is limited to −Tfric according to its limiting function. In turn-back steering from the position (d) to the position (a), the steering shaft 2 halts, so that a friction state takes a static friction region, resulting in the change from −Tfric to Tfric. At this time, because change of static friction torque becomes predominant also in change of the steering-shaft reaction torque, the output of the integrator 17 changes from −Tfric to Tfric.

As described above, by processing the steering-shaft reaction torque by the differentiator 16 and the integrator 17 with the limiting function, changes of friction torque, namely, changing states of dynamical friction and static friction can be determined.

By a multiplier 18, a friction transition-state, namely, a changing state in a hysteresis width of the steering-shaft reaction torque is outputted, by multiplying a reciprocal number of Tmax by an output result of the integrator 17, after having performed the normalization by a value from −1 to 1. That is to say, value "1" is outputted between the positions from the position (a) to the position (b); value from "1" to "−1," outputted from the position (b) to the position (c); value "−1," outputted between the positions from the position (c) to the position (d); and value from "−1" to "1," outputted from the position (d) to the position (a).

As for the setting of the limiting value Tmax, it is simply required to use a friction width Tfric actually measured. Note that, it is not required to set Tmax at a constant value. Because friction of the steering mechanism influences on Tfric, the limiting value may be modified in accordance with, for example, a vehicle speed and a steering angle, steering torque and steering-shaft reaction torque, road-surface reaction torque, and an ambient temperature which relate to the friction of the steering mechanism. According to the modification, even when hysteresis widths change, a friction transition-state can be accurately determined.

At Step S5, in the assist instruction-value correction means 14, an assist correction value is calculated from a friction transition-state determination-result and the steering-shaft reaction torque.

Figure 7:
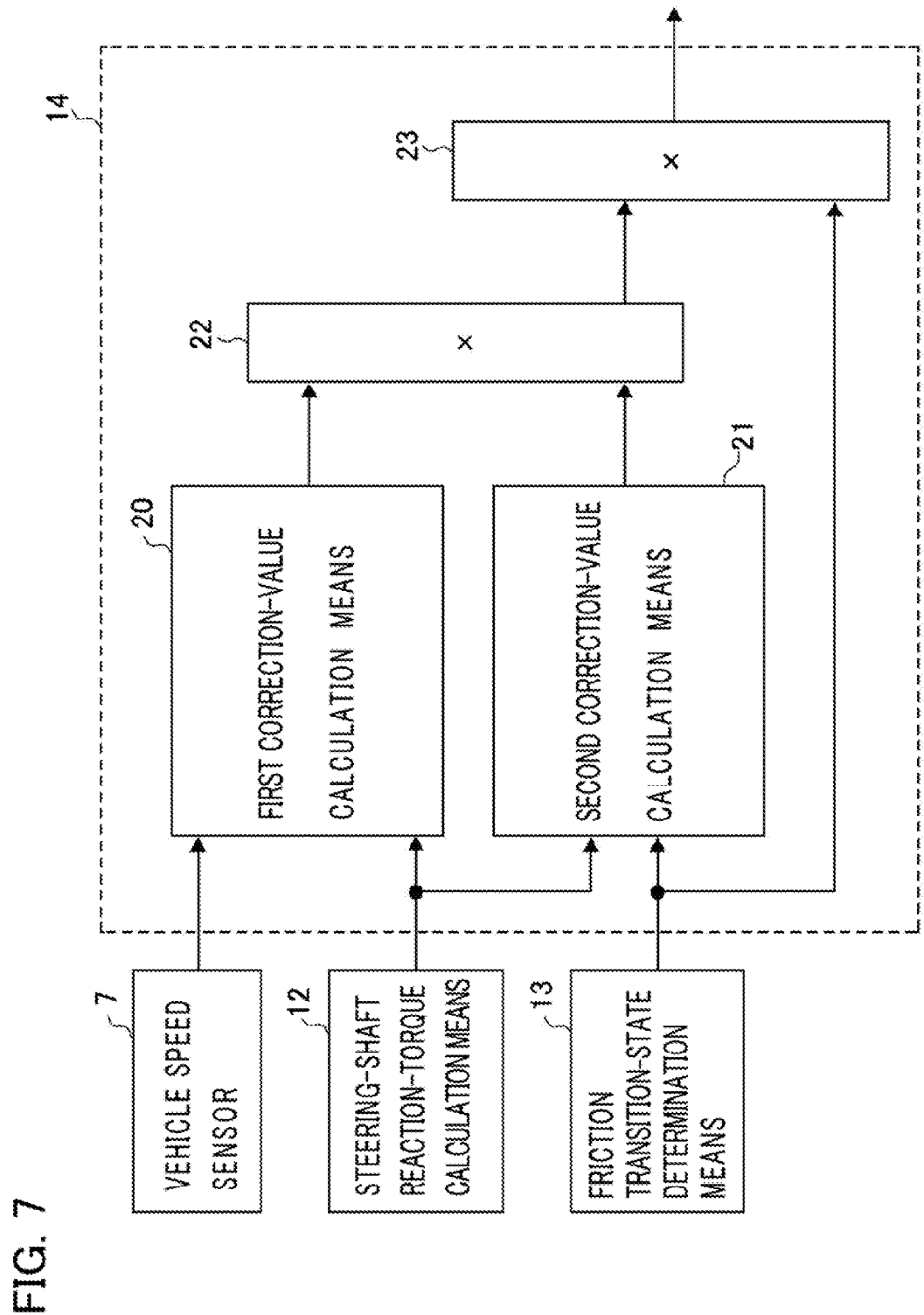
FIG. 7 is a block diagram illustrating a configuration of an assist instruction-value correction means in the steering control apparatus according to Embodiment 1 of the present invention.
Figure 8:
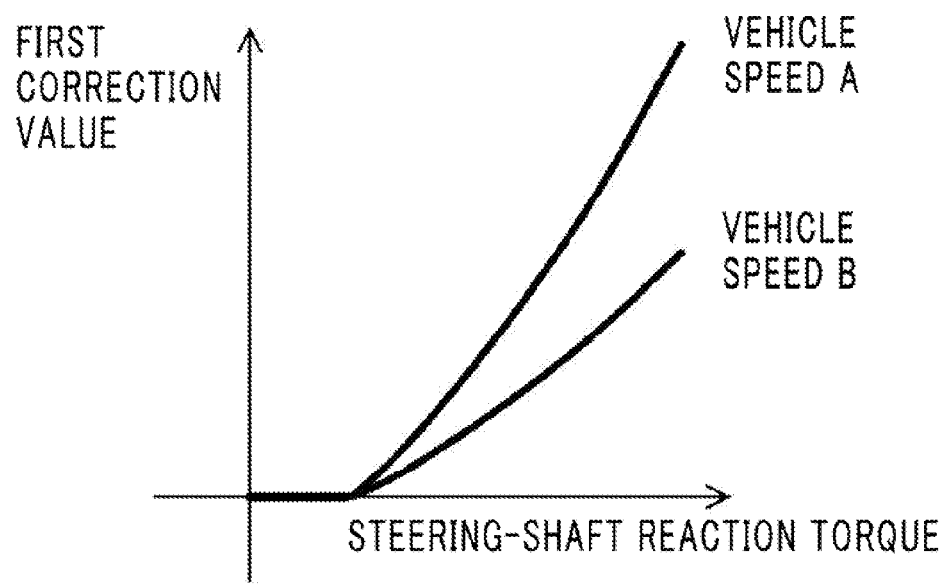
FIG. 8 is a diagram showing a map of first correct ion values in the steering control apparatus according to Embodiment 1 of the present invention.

FIG. 7 is a block diagram illustrating a configuration of the assist instruction-value correction means 14. In a first correction-value calculation means 20, a first correction value for calculating an assist correction value is calculated in accordance with a vehicle speed and the steering-shaft reaction torque. A first correction value map defining the relationship among steering-shaft reaction torque Ttran, a vehicle speed V and a first correction value is formed in advance, and, from the first correction value map, a first correction value is read out in accordance with the steering-shaft reaction torque Ttran and the vehicle speed V. An example of the first correction value map is shown in FIG. 8.

By taking the configuration so that a correction value can be adjusted in accordance with a vehicle speed, it becomes possible to provide hysteresis-width adjustment of steering torque in accordance with the vehicle speed, and thus the optimization of steering feelings is made possible.

In a second correction-value calculation means 21, a region to perform assist correction is restricted; that is to say, a second correction value is calculated as the basis for determination as to whether or not performing the correction. Here, when a sign of the steering-shaft reaction torque and that of a normalized friction transition-state differ in signs to each other, the range is set as an assist-correction performing region, and the second correction value is set at "1." In other region, the second correction value is set at "0." As a result, the second correction value is set at "1" in the region of a portion from the position (b) toward the position (c), that from the position (c) to the position (f), that of a portion from the position (d) toward the position (a), and that from the position (a) to the position (e).

A multiplier 22 performs a multiplication of a first correction value and a second correction value to give a third correction value.

A multiplier 23 performs a multiplication of the third correction value and a normalized friction transition-state to give an assist correction value.

At Step S6, an electric current instruction-value after having been made its correction is given in the subtracter 15 by subtracting an assist correction value from an assist instruction-value and calculating an assist instruction-value after having been made its correction. Note that, because the normalized friction transition-state and the third correction value are multiplied by the multiplier 23, the assist instruction-value increases in accordance with an assist correction-value, in return steering after turn-back steering, on the basis of the subtracter 15 shown in FIG. 2. Namely, the quantity of assist increases in the region of a portion from the position (b) toward the position (c), that from the position (c) to the position (f), that of a portion from the position (d) toward the position (a), and that from the position (a) to the position (e).

At Step S7, in the electric current driving means 10, an electric current of the motor 5 is driven so that an electric current thereof is coincident with an electric current instruction-value after having been made its correction, and the motor 5 produces assist torque corresponding to the electric current instruction-value after having been made its correction.

Next, the explanation will be made for the effects in this embodiment in comparison with conventional technologies.

Figure 11:
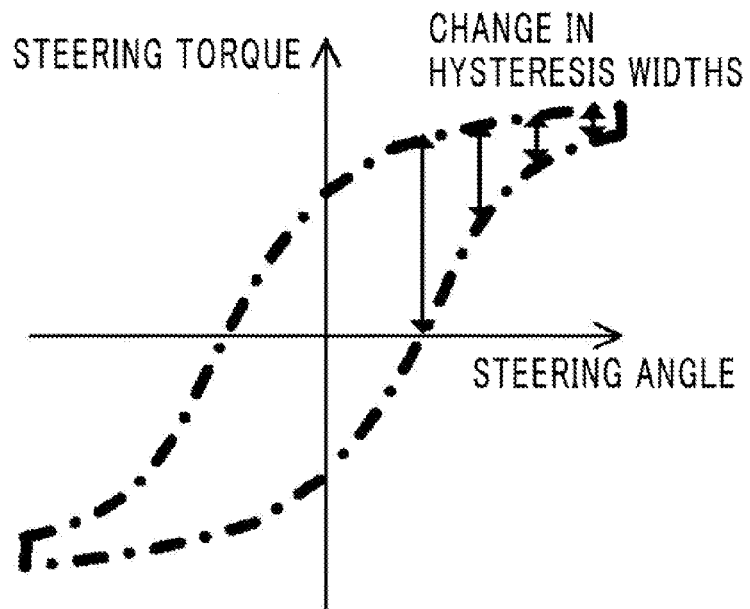
FIG. 11 is a diagram illustrating characteristics of a steering angle and steering torque in conventional technologies.
Figure 12:
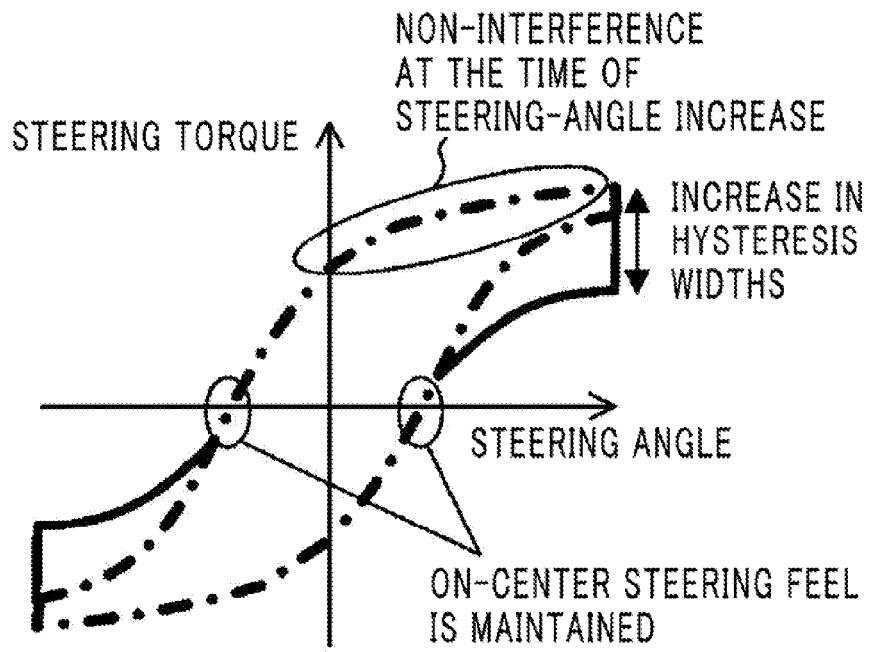
FIG. 12 is a diagram illustrating hysteresis-width adjustment of steering torque.

In conventional technologies, steering-shaft reaction torque takes on a hysteresis characteristic due to the influence of friction torque, as exactly set forth in Patent Document 1. For this reason, the hysteresis characteristic is generated also in steering torque after the steering assist by electric power steering. As for this hysteresis width, when the steering angle becomes larger and the steering torque does higher, the hysteresis width of steering torque is reduced, as shown in FIG. 11. When the hysteresis width of steering torque Thdl becomes smaller, there arises a problem in that steering feelings are degraded such that a state of steering "holding" is difficult to be continued, and the return-steering feel gets stronger at the time of return steering. In Patent Document 1, an automotive steering control apparatus is proposed to cope with these problems in which correction values are calculated by using both of a steering-shaft reaction-torque detection means and a road-surface reaction-torque detection means, and hysteresis widths of steering torque are adjusted. According to this arrangement, it becomes possible to achieve adjusting hysteresis widths of steering torque as shown in FIG. 12. However, a configuration is taken to use road-surface reaction torque, so that it is required to include the road-surface reaction-torque detection means, causing problems in securing a mounting space for the road-surface reaction-torque detection means, and increase in the number of mounting man-hours. In addition, when a technique for estimating road-surface reaction torque is applied without including a detection device, there arise problems in an increase in the number of man-hours for designing parameters used by an estimator, an increase in a calculation load of the estimator, and the like. Moreover, the configuration is taken to determine a steering state by comparing the steering-shaft reaction torque with road-surface reaction torque, so that there arises a problem in that a highly accurate detection value or a highly accurate estimation value is required for the road-surface reaction torque to be used.

For dealing therewith, in this embodiment, an assist correction value can be calculated, without using road-surface reaction torque, by only using steering-shaft reaction torque, so that a mounting space for the road-surface reaction-torque detection means is not required, and the number of mounting man-hours therefor nor the number of designing man-hours for a road-surface reaction-torque estimator does not arise. In addition, because a calculation load of the present invention is smaller in comparison with a calculation load of a road-surface reaction-torque estimator, such an effect can also be achieved as reducing the calculation load.

Moreover, the steering-shaft reaction torque is high in its accuracy because the steering torque and the motor current are directly detected and used, so that a friction transition-state can be accurately determined.

A hysteresis width of steering torque is caused by a transition state of friction torque, and an assist correction value for correcting the hysteresis width can be calculated based on the friction transition-state; and therefore, the hysteresis widths of steering torque can be adjusted without causing abnormal feelings. In particular, by performing a multiplication of a third correction value and a normalized friction transition-state by the multiplier 23 to give an assist correction value, it becomes possible to continuously give the assist correction value from zero in a turn-back steering region, and to smoothly adjust the hysteresis widths of steering torque.

According to this embodiment, it also becomes possible, in return steering from turn-back steering, to mitigate the steering torque and to increase hysteresis widths of steering torque without changing the steering torque at the time of steering-angle increase and without changing the steering torque in vicinity to the neutral point (on-center steering feel).

Note that, as a conventional technology, a technique is also proposed in which an assist correction value is calculated based on a steering-wheel's rotational direction (steering velocity) such as Patent Document 2, for example.

Because a hysteresis width of steering torque is due to friction torque of the steering mechanism, and the dynamical friction acts in accordance with a direction of steering velocity, it is possible to obtain a state of dynamical friction even in a case which is based on a steering-wheel's rotational direction.

However, because a steering velocity and static friction do not correspond to each other in relationship therebetween, it is difficult to determine friction transition-states from dynamical friction to static friction, and from static friction to dynamical friction at the times of turn-back steering shown from the position (b) to the position (c), and from the position (d) to the position (a), respectively. As a result, when a steering velocity is used, it is difficult to give an assist correction value in accordance with a change in the friction torque; it is feared that abnormal feelings are caused in turn-back steering regions, and that vibration may be generated due to abrupt addition of an assist correction value. In addition, in order to curb vibration, countermeasure is required in which processing is performed by a low-pass filter with a low cutoff frequency or the like, so that it is feared that the response may be delayed to cause abnormal feelings.

For dealing therewith, in this embodiment, a transitional change of friction torque is directly calculated in good accuracy, and the assist correction is performed in accordance with the change, so that appropriate feeling adjustment can be performed by a simple control logic.

Embodiment 2

An overall configuration and operations of a steering control apparatus according to Embodiment 2 take the same as those in Embodiment 1 described above; thus, their explanation is omitted here. In addition, the same reference numerals and symbols are used to designate the common or equivalent configuration to that in Embodiment 1 described above, and so the explanation will be hereinafter made mainly for a configuration and the operations of the assist instruction-value correction means 14 which is a different point to that in Embodiment 1.

Figure 9:
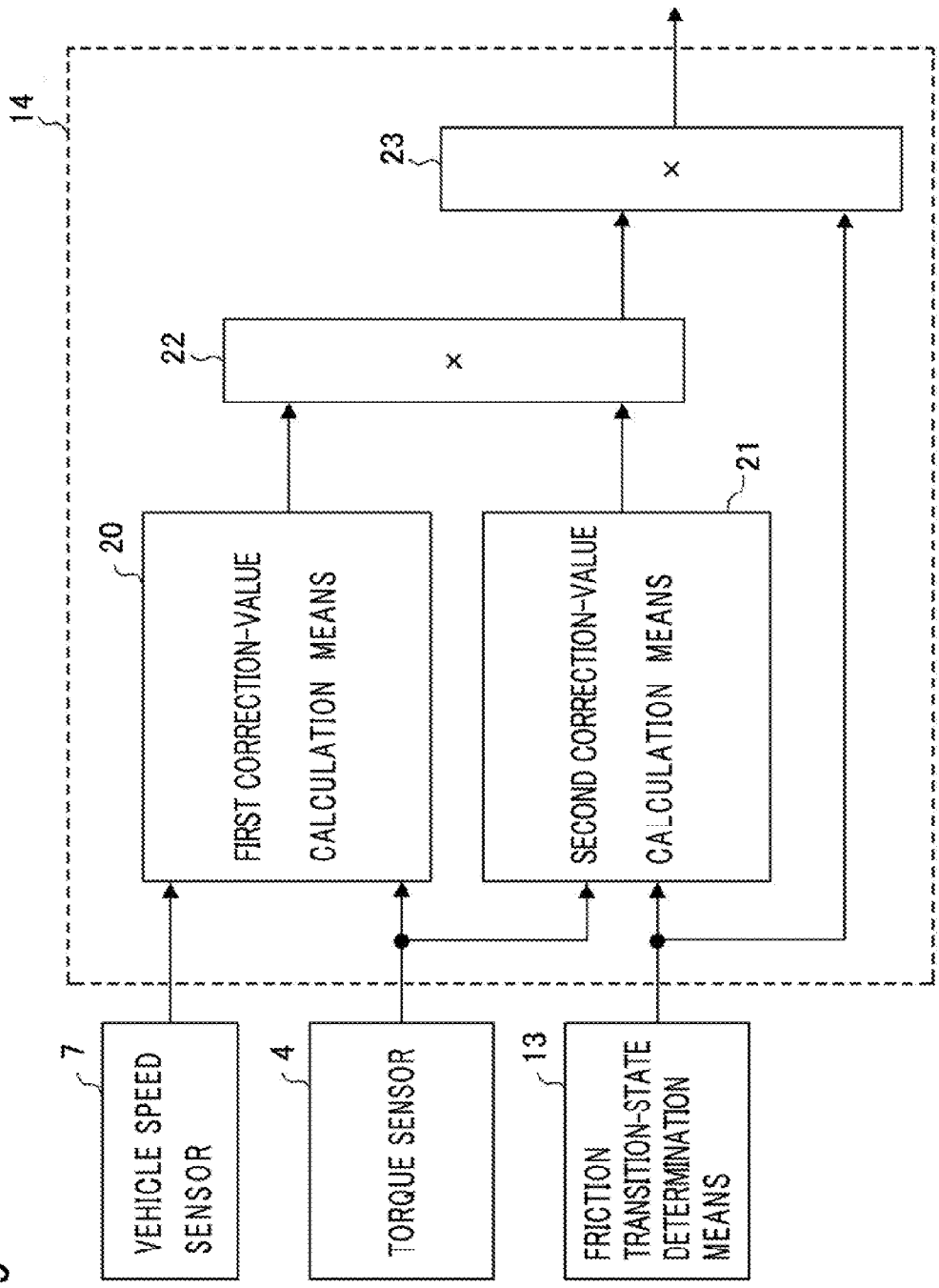
FIG. 9 is a block diagram illustrating a configuration of an assist instruction-value correction means in a steering control apparatus according to Embodiment 2 of the present invention.

FIG. 9 is a block diagram illustrating a configuration of the assist instruction-value correction means 14 in Embodiment 2.

Figure 10:
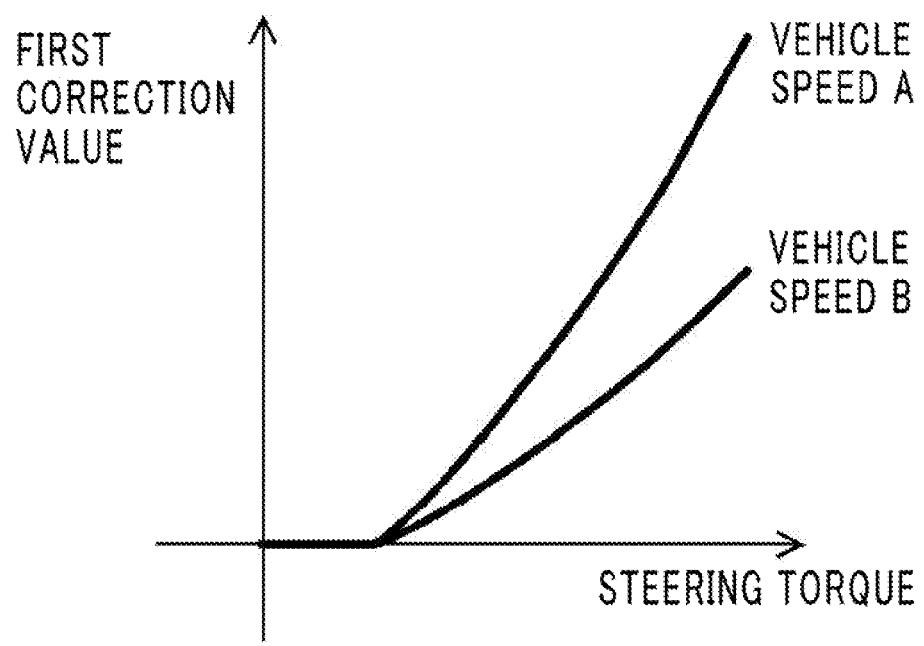
FIG. 10 is a diagram showing a map of first correction values in the steering control apparatus according to Embodiment 2 of the present invention.

In the first correction-value calculation means 20, a first correction value for calculating an assist correction value is calculated in accordance with a vehicle speed and steering torque detected by the torque sensor. A first correction value map defining the relationship among steering torque, a vehicle speed V and a first correction value is formed in advance, and, from the first correction value map, a first correction value is read out in accordance with the steering torque and the vehicle speed V. An example of the first correction value map is shown in FIG. 10. By taking the configuration so that a correction value can be adjusted in accordance with a vehicle speed and steering torque, it becomes possible to provide hysteresis-width adjustment of steering torque in accordance with the vehicle speed and the steering torque, and the optimization of steering feelings is made possible.

In second correction-value calculation means 21, a second correction value is calculated for setting a region to perform assist correction. Here, when a sign of steering torque and that of a normalized friction transition-state differ in signs to each other, the range is set as an assist-correction performing region, and the second correction value is set at "1." In other region, the second correction value is set at "0." As a result, the second correction value is set at "1" in the region of a portion from the position (b) toward the position (c), that from the position (c) to the position (f), that of a portion from the position (d) toward the position (a), and that from the position (a) to the position (e).

The multiplier 22 performs a multiplication of a first correction value and a second correction value to give a third correction value. Note that, by combining a signal used for region setting with a signal used in the first correction-value calculation means 20, the third correction value becomes continuous, so that it is possible to prevent discontinuous changes.

The multiplier 23 performs a multiplication of the third correction value and a normalized friction transition-state to give an assist correction value.

In the configuration of Embodiment 2, it is possible to obtain effects similar to those set forth in Embodiment 1. In addition, when an assist correction value is adjusted by the evaluation using an actual vehicle, what an adjusting driver actually feels is the steering torque; and therefore, there exists an effect that the adjustment is made easy by an assist correction-value map in which the horizontal axis is steering torque.

Note that, an example has been shown in which steering-shaft reaction torque or steering torque is utilized as a signal used in the assist instruction-value correction means 14; however, there is no need to limit to the signal.

In second correction-value calculation means 21, it may be adopted that, in place of the steering-shaft reaction torque or the steering torque, a steering-quantity detection means is included which detects a signal corresponding to a driver's steering-wheel steering quantity such as a motor current, a steering angle or a wheeled-vehicle's a yaw rate, and that the second correction value is set at "1" when a sign of the steering-wheel steering quantity detected by the steering-wheel steering-quantity detection means, and that of a normalized friction transition-state determination-value differ in signs to each other.

Embodiment 3

An overall configuration and operations of a steering control apparatus according to Embodiment 3 take the same as those in Embodiment 1 or Embodiment 2 described above; thus, their explanation is omitted here. In addition, the same reference numerals and symbols are used to designate the common or equivalent configuration to that in Embodiment 1 or Embodiment 2 described above, and so the explanation will be hereinafter made mainly for the operations of the assist instruction-value correction means 14 which is a different point to that in Embodiment 1 or Embodiment 2.

In Embodiment 1 and Embodiment 2, described is the calculation method of an assist correction value, at the time of turn-back steering, which is given at the time of return steering from steering "holding" to the neutral point.

In this embodiment, its configuration is similar to those in Embodiment 1 and Embodiment 2; however, the explanation will be made for the configuration in which, at the time of turn-back steering, a hysteresis width of steering torque is adjusted by giving an assist correction value from steering-angle increase toward steering "holding."

In the first correction-value calculation means 20, a first correction value for calculating an assist correction value is calculated in accordance with a vehicle speed and steering torque detected by the torque sensor. A first correction value map defining the relationship among steering torque, a vehicle speed V and a first correction value is formed in advance, and, from the first correction value map, a first correction value is read out in accordance with the steering torque and the vehicle speed V. An example of the first correction value map is shown in FIG. 10.

By taking the configuration so that a correction value can be adjusted in accordance with a vehicle speed and steering torque, it becomes possible to provide hysteresis-width adjustment of steering torque in accordance with the vehicle speed and the steering torque, and the optimization of steering feelings is made possible.

In order to increase a hysteresis width of steering torque at the time of turn-back steering including an occasion of steering-angle increase, it is required to increase the steering torque; and thus, a first correction value is set in order to reduce the assist instruction-value.

In second correction-value calculation means 21, a second correction value is calculated for setting a region to perform assist correction. Here, when a sign of steering torque and that of a normalized friction transition-state are the same signs, the range is set as an assist-correction performing region, and the second correction value is set at "1." In other region, the second correction value is set at "0."

The multiplier 22 performs a multiplication of a first correction value and a second correction value to give a third correction value. Note that, by combining a signal used for region setting with a signal used in the first correction-value calculation means 20, the third correction value becomes continuous, so that it is possible to prevent discontinuous changes.

The multiplier 23 performs a multiplication of the third correction value and a normalized friction transition-state to give an assist correction value. According to this arrangement, the friction torque transits to static friction torque at the time of turn-back steering, so that an assist correction value can be reduced to zero in accordance with the acting direction being reversed; and thus, hysteresis widths of steering torque can be smoothly adjusted.

Also in the configuration of Embodiment 3, it is possible to obtain effects similar to those explained in the statements of Embodiment 1.

In addition, when an assist correction value is adjusted by the evaluation using an actual vehicle, what an adjusting driver actually feels is the steering torque; and therefore, there exists an effect that the adjustment is made easy by an assist correction-value map in which the horizontal axis is steering torque.

Note that, in place of the steering torque, steering-shaft reaction torque may be used as stated in Embodiment 1. In addition, in second correction-value calculation means 21, it may be adopted that, in place of the steering-shaft reaction torque or the steering torque, a steering-quantity detection means is included which detects a signal corresponding to a driver's steering-wheel steering quantity such as a motor current, a steering angle or a wheeled-vehicle's a yaw rate, and that the second correction value is set at "1" when a sign of the steering-wheel steering quantity detected by the steering-wheel steering-quantity detection means, and that of a normalized friction transition-state determination-value are the same signs.

In the present invention, each of the embodiments can be freely combined, and/or each of the embodiments can be appropriately modified or eliminated without departing from the scope of the invention.

EXPLANATION OF NUMERALS AND SYMBOLS

Numeral "2" designates a steering shaft; "3," wheels; "4," steering torque detection means (torque sensor); "5," motor; "7," vehicle speed detection means (vehicle speed sensor); "9," control unit; "10," electric current driving means; "11," basic assist instruction-value calculation means; "12," steering-shaft reaction-torque calculation means; "13," friction transition-state determination means; "14," assist instruction-value correction means; "15," subtracter; "16," differentiator; and "17," integrator.

What is claimed is:
1. A steering control apparatus, comprising:
   a steering torque detection device for detecting steering torque of a steering mechanism steered by a driver of a wheeled vehicle;
   a vehicle speed detection device for detecting a vehicle speed of the wheeled vehicle;
   a motor for giving steering assist force thereby to the steering mechanism;

a steering-shaft reaction-torque calculation device for detecting or calculating steering-shaft reaction torque acting on a steering shaft of the steering mechanism;

a basic assist instruction-value calculation device for calculating a basic assist instruction-value being an electric current instruction-value to cause a current flow in the motor, based on steering torque detected by the steering torque detection device, and a vehicle speed detected by the vehicle speed detection device;

a friction transition-state determination device for determining a friction transition-state, based on the steering-shaft reaction torque;

an assist instruction-value correction device for calculating, based on a result of the friction transition-state determination device, an assist correction value in order to obtain an assist instruction-value after its correction being made by correcting the basic assist instruction-value so that a hysteresis width of steering torque increases at a time of turn-back steering; and an electric current driving device for driving the motor so that an electric current instruction-value therefor after its correction being made on a basis of the assist instruction-value after its correction being made, wherein the friction transition-state determination device determines a friction transition-state by integrating a differential value of the steering-shaft reaction torque using an integrator having a limiting function to an upper and lower limit value, and the upper and lower limit value is defined based on a measured friction torque acting on the steering mechanism.

2. The steering control apparatus as set forth in claim 1, wherein the steering-shaft reaction-torque calculation device calculates the steering-shaft reaction torque in accordance with said steering torque, and an electric current of the motor or an election current instruction-value therefor after its correction being made.

3. The steering control apparatus as set forth in claim 1, wherein the assist instruction-value correction device comprises a correction-value calculation device for calculating a correction value as a basis for determination as to whether or not to perform correction of an assist instruction from a result of the friction transition-state determination device, and the steering-shaft reaction torque or said steering torque.

4. The steering control apparatus as set forth in claim 3, wherein the assist instruction-value correction device comprises a correction-value calculation device for calculating a correction value as a basis for determination as whether or not to perform correction of an assist instruction from a result of the friction transition-state determination device, and the steering-shaft reaction torque or said steering torque.

5. The steering control apparatus as set forth in claim 3, wherein the assist instruction-value correction device calculates a first correction value from the vehicle speed, and the steering-shaft reaction torque or said steering torque, and calculates the assist correction value by multiplying a result of the friction transition-state determination device by a multiplied value of the first correction value and a correction value from the correction value calculation device.

6. The steering control apparatus as set forth in claim 4, wherein the assist instruction-value correction device calculates a first correction value from the vehicle speed, and the steering-shaft reaction torque or said steering torque, and calculates the assist correction value by multiplying a result of the friction transition-state determination device by a multiplied value of the first correction value and a correction value from the correction-value calculation device.

7. The steering control apparatus as set forth in claim 1, wherein the upper and lower limit value is not a constant value.

8. The steering control apparatus as set forth in claim 1, wherein the upper and lower limit value is modified in accordance with at least one of a vehicle speed, a steering angle, a steering torque, a steering-shaft reaction torque, a road-surface reaction torque, and an ambient temperature.

\* \* \* \* \*